United States Patent Office 3,745,037
Patented July 10, 1973

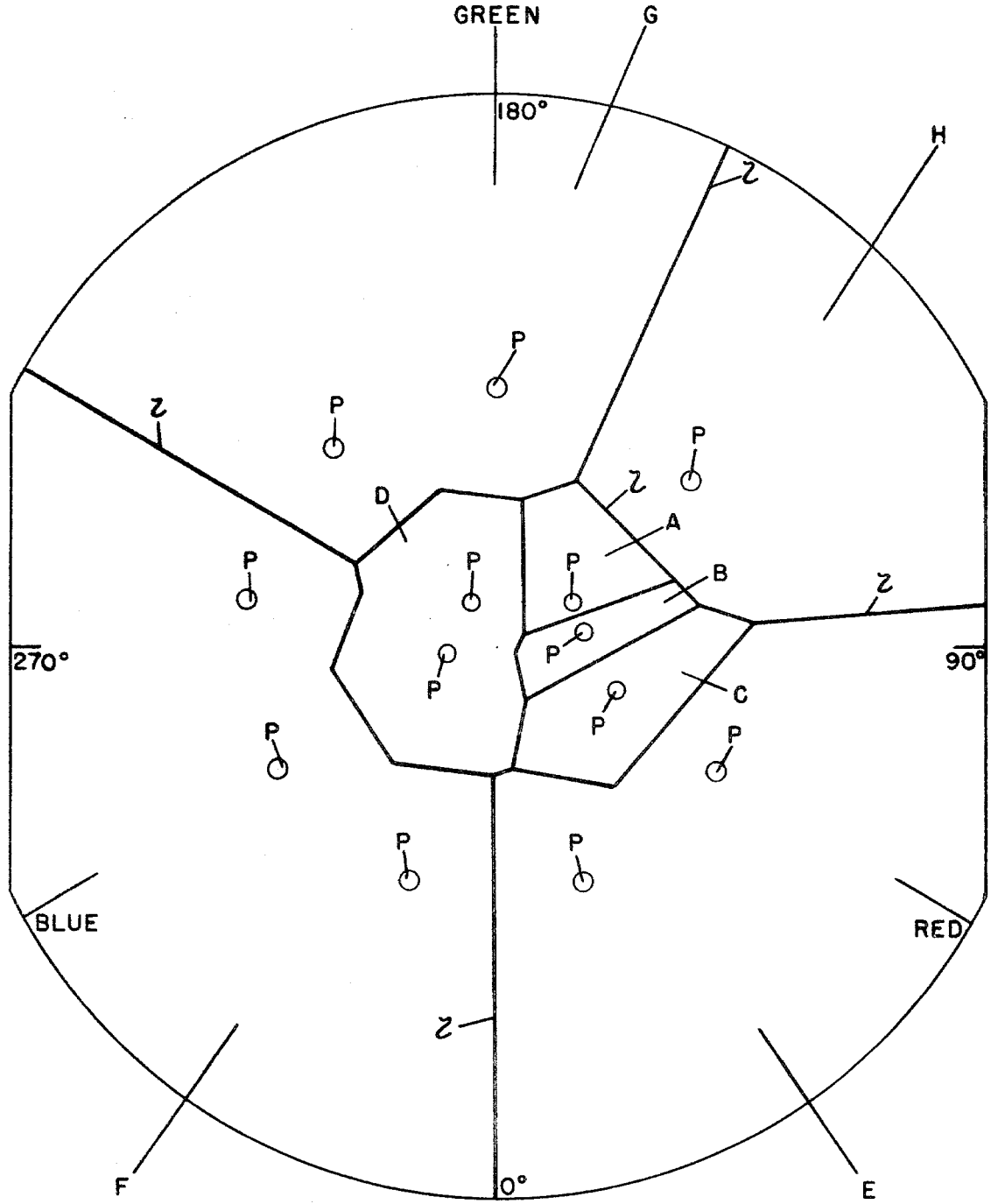

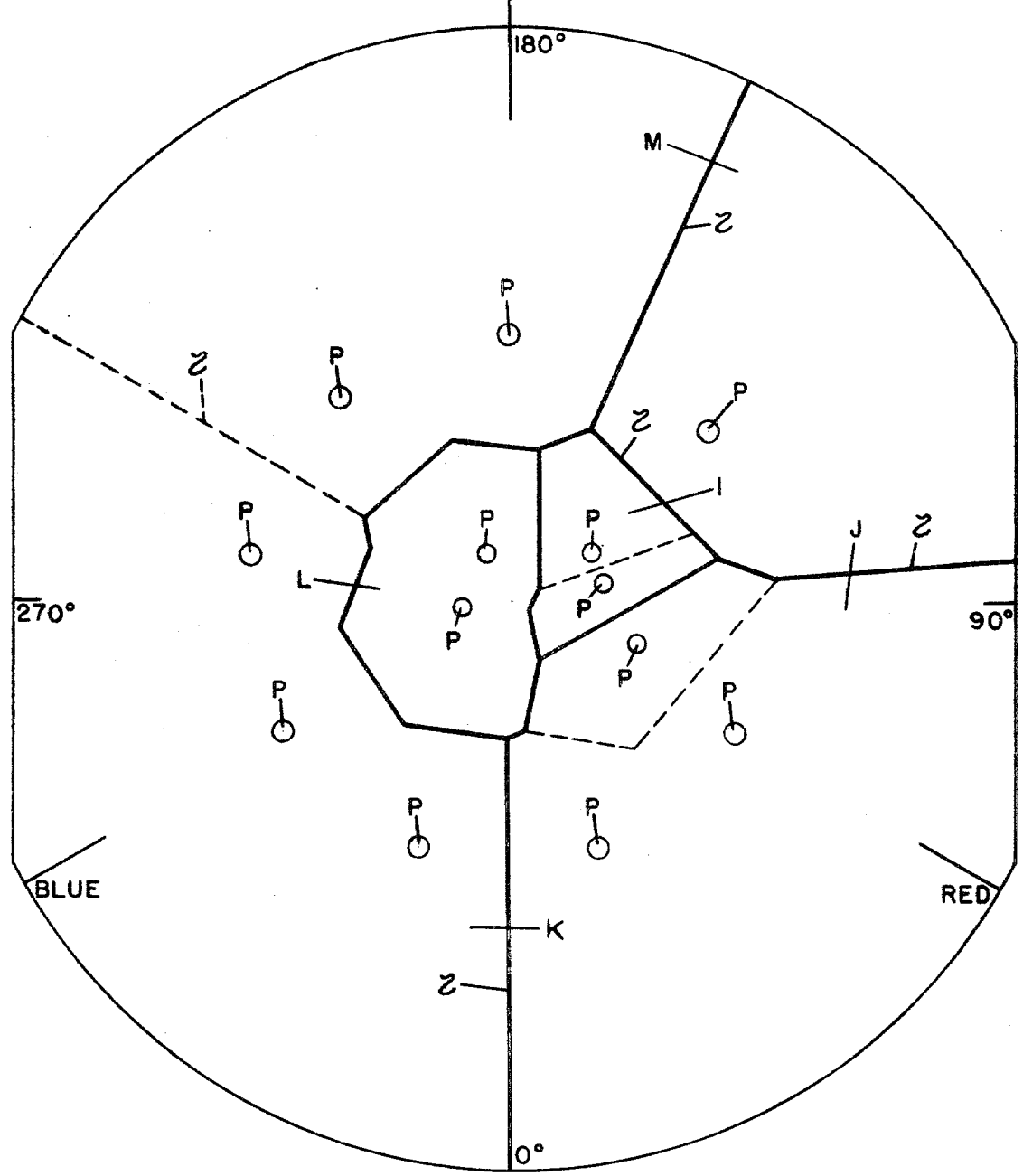

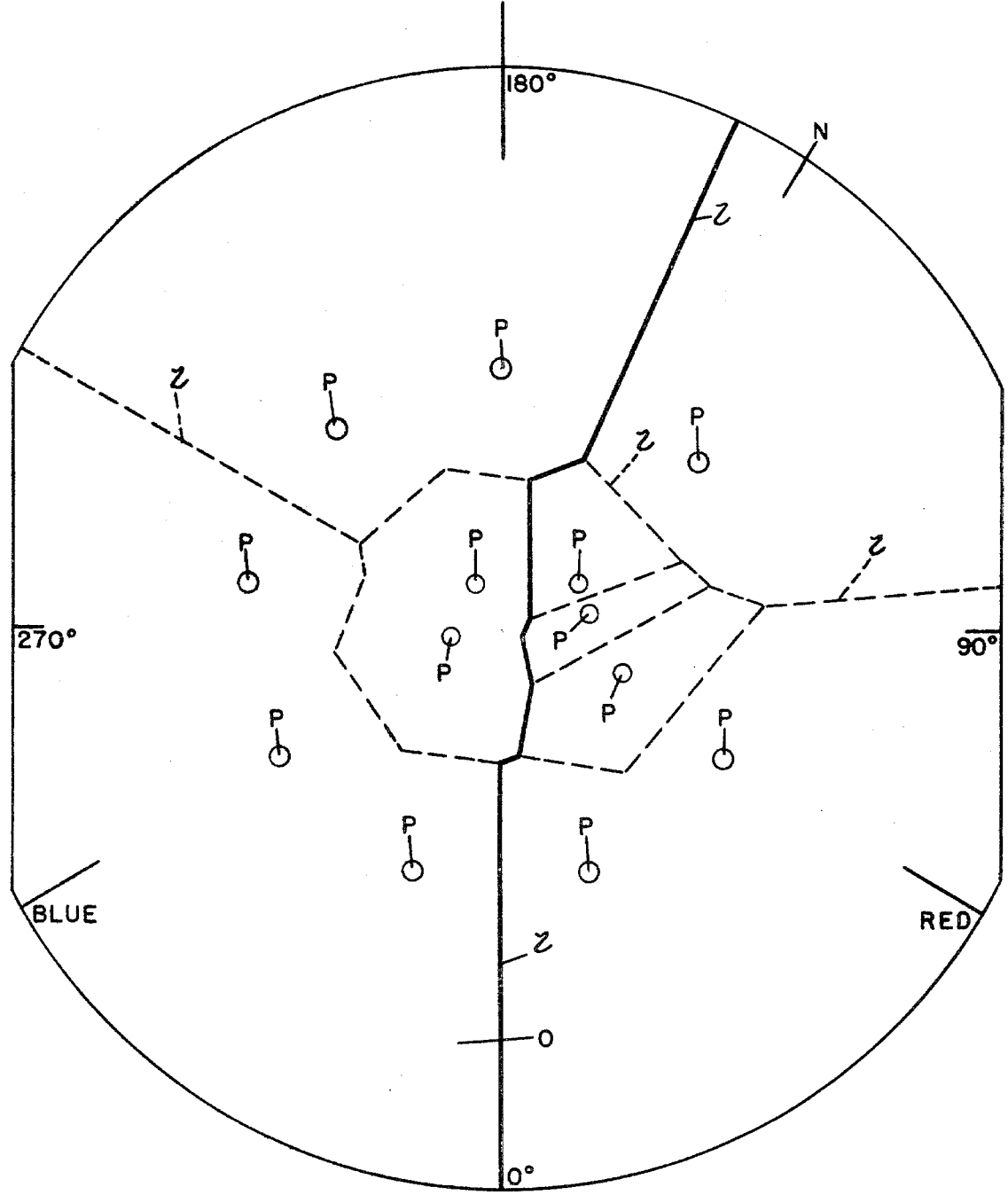

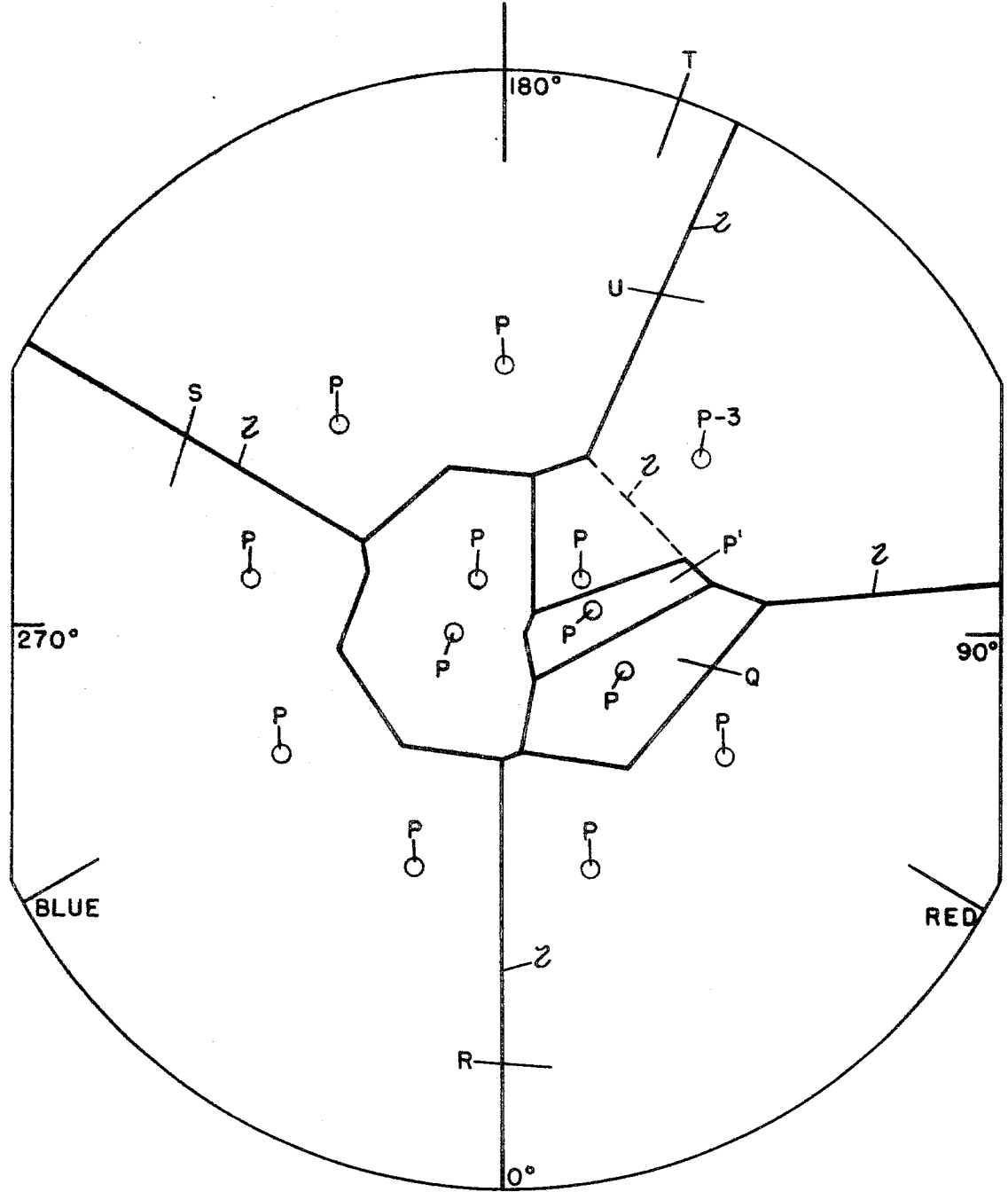

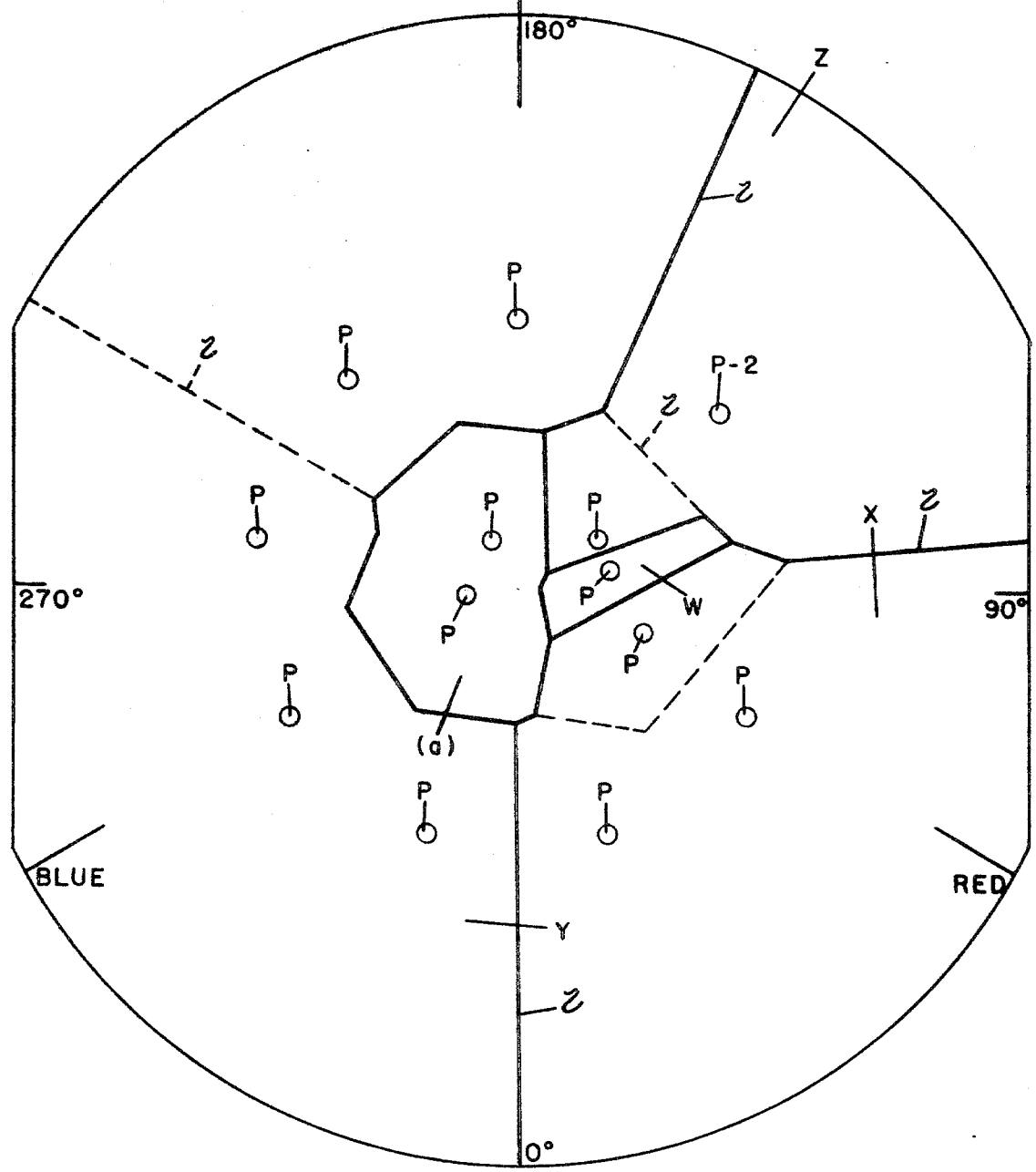

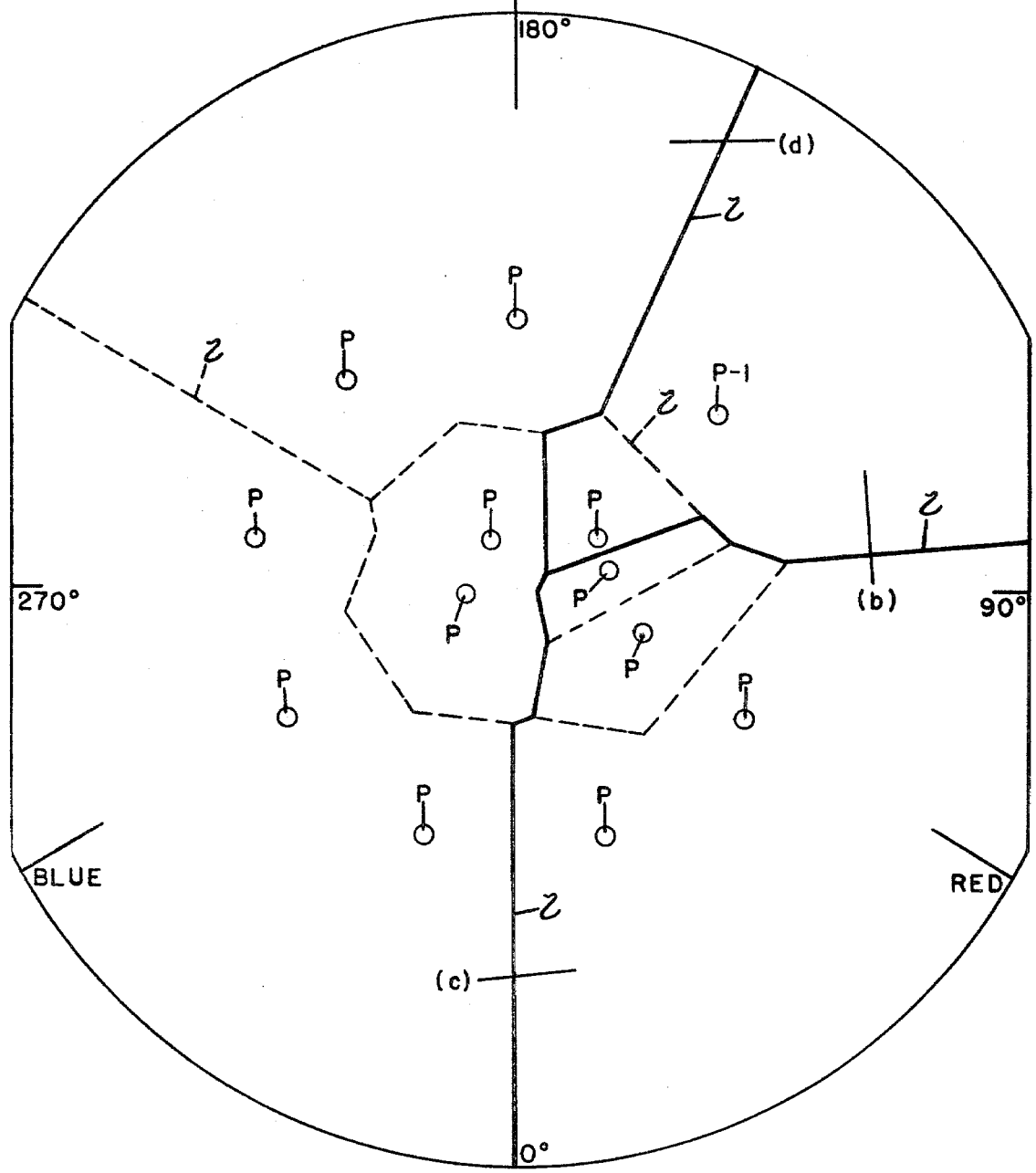

3,745,037
METHOD FOR PRODUCING DIAGRAMMED WORK SURFACES ON WHICH ARE CREATED ARTISTIC RENDERINGS OF MULTI-COLOR IMAGES
John Kent Bowker, Marblehead, Mass., assignor to Itek Corporation, Lexington, Mass.
Filed Mar. 26, 1971, Ser. No. 128,418
Int. Cl. H04g 1/00, 1/46
U.S. Cl. 117—37 R    26 Claims

ABSTRACT OF THE DISCLOSURE

A given image such as a color photograph is used to produce a work surface retaining diagrammed boundaries that define general areas on which distinctly colored paints can be applied to create a rendering of the picture images on the photograph. Selected and identified, in a given colorimetric system, are boundaries of color domains corresponding generally to color tonalities of the photograph. A distinctly colored oil paint is then provided to represent each of the color domains and each paint color is given an identifying designation. Scanning through discrete portions of the photograph with a suitable color analyzer system establishes in the given colorimetric system the coordinate positions of the colors present in each of the portions scanned. Next, a determination is made as to the particular one of the selected color domains encompassing the color coordinate position of each of the analyzed colors in the photograph. Finally, discrete areas of the paint receiving work surface that correspond geometrically in position to the discrete portions scanned in the photograph are located and there is applied to each work surface area the designation for that paint color representing the color domain that encompasses the color coordinate position of the analyzed color in the geometrically corresponding portion of the photograph. Application to the work surface areas of the distinct colored paint designated thereon results in an artistic rendering of the image scene retained by the original photograph.

BACKGROUND OF THE INVENTION

This invention relates generally to an analytical method for producing on an appropriate surface the rendering of a particular multi-colored image. The method of the present invention is particularly well suited for assisting artists in the creation of original oil paintings of images first recorded on photographic film.

There are available commercially various types of products designed to assist a user in the creation of an artistic rendering. Such products include, for example, fabrics imprinted with designs used during application of decorative stitching and other needlework, imprinted diagrams used during assembly of ceramic mosaics, various types of paint receiving surfaces bearing individually designated color outlines to be followed during the application of oil paints or water colors, etc. One of the best known of the foregoing product types involves the so-called "paint-by-number" technique for creating oil paintings. According to this technique, a popular oil painting "masterpiece" is used as a model by a commercial artist who generates what might be described as a color contour diagram of the original. Such a contour diagram outlines a plurality of individual areas each bearing a designation for a particular colored paint to be applied thereto. The various distinctly colored paints required are supplied as a palette with the color contour diagram. The paint colors provided in a given palette are determined by the commercial artist who attempts to select for each of the designated areas a paint color corresponding as nearly as possible to the color present in the corresponding area of the original painting. Generally, to minimize cost and reduce the intricacy of the color contour diagram, a limited number of individual colors are provided, typically between 10 and 30.

Because of the substantial human effort required to generate a color contour diagram and to select an appropriate paint palette for use therewith, the variety of original paintings available in paint-by-number form is quite limited. This lack of subject variety in addition to the absence of individuality in a finished product have substantially limited the market for products of this type. A larger selection of subjects and greater intimacy in end results obviously would enhance market potential. Both of these objectives would accrue if a customer could select for rendering any scene with which he is intimately connected and which had been previously recorded on photographic film. For example, a much larger segment of the public would be interested in creating an original oil painting based on a colored photograph of a relative, a close friend, a familiar landscape, an admired architectural object such as one's own home, etc.

Thus, one problem presented above was to provide a set of premixed pigment colors that could be used to create a tonally correct and harmonious oil painting of any preselected photograph. A solution to the problem, however, was not available with the conventional color reproduction techniques employed, for example, in the fields of photography, color television and printing. Color reproduction systems in these fields rely on Newtonian theory that sets forth the generalization that all colors can be defined in terms of fixed primaries colors R, $\vec{G}$ and B. A specific color $\vec{Q}$ is then defined as a vector in three-dimensional space equal to $$r\vec{R} + g\vec{G} \text{ plus } b\vec{B}$$

where the values $r$, $g$ and $b$ are the tristimulus values of the color with respect to the particular set of primary colors R, G and B. A color to be reproduced is first spectrally analyzed by a suitable device such as a color television camera, to determine the component values $r$, $g$ and $b$. These values are then used to selectively control the proportionalities of primary color light sources used to reproduce the color. The reproduction can entail an additive process in which appropriate values of the three primary colors, such as the commonly used red, green and blue, are added or a subtractive system in which a tri-color set such as cyan (minus red), magenta (minus green) and yellow (minus blue) absorbs desired amounts of incoming primary colors. Color television, for example, is strictly an additive process in which red, green and blue phosphors are selectively activated to produce a desired color while color photography is a subtractive process in which appropriate thicknesses of color layers subtract light from incident white light to produce the desired color in either transmitted or reflected light. In all such analytical color reproduction systems, however, a substantially infinite variation of the reproduction color stimuli is available to reproduce the measured tristimulus values of the original color. Thus, the reproduced color comprises appropriate values of each of the primary colors that synthesize the color desired.

It will be apparent that these conventional color reproduction techniques are not applicable to the present problem in which color selections must be made from a palette consisting of premixed paints. The color space represented by such a palette is similar to the digitized hyperspace of dimensions common to object recognition, and is quite different from conventional analytic color space.

The object of this invention, therefore, is to provide an effective and practical method for producing sets of diagrammed paint boards and associated palettes that can be used to generate tonally correct and harmonious oil paint renderings of color photographs.

SUMMARY OF THE INVENTION

The present invention is characterized by a method for producing for a given multi-colored image, a diagrammed work surface on which distinctly colored substances can be applied to create an artistic rendering of the image. In a specific application of the method, a colored photograph is used to produce a work surface retaining diagrammed boundaries that define general areas on which distinctly colored paints can be applied to create a rendering of the picture imaged on the photograph. According to the invention there are selected and identified, in a given colorimetric system, the boundaries of color domains corresponding generally to color tonalities of the photograph. A distinctly colored oil paint is then provided to represent each of the color domains and each paint color is given an identifying designation. Scanning through discrete portions of the photograph with a suitable color analyzer system establishes in the given colorimetric system the coordinate positions of the colors present in each of the portions scanned. Next, a determination is made as to the particular one of the selected color domains encompassing the color coordinate position of each of the analyzed colors in the photograph. Finally, discrete areas of the paint receiving work surface that correspond geometrically in position to the discrete portions scanned in the photograph are located and there is applied to each work surface area the designation for that paint color representing the color domain that encompasses the color coordinate position of the analyzed color in the geometrically corresponding portion of the photograph. Application to the work surface areas of the distinct colored paint designated thereon results in an artistic rendering of the image scene retained by the original photograph.

Another featured step of the present invention involves imprinting outlines of distinguishable objects present in the photograph on the paint receiving work surface. The object outlines are superimposed on the color designated areas of the work surface and are preferably produced by a suitable printing mechanism controlled by a light intensity gradient detector that scans the photograph simultaneously with the color analyzer. The outlines assist the artist in creating distinguishable object boundaries for the artistic rendering during the application of paints to the color designated areas.

According to a preferred embodiment of the invention, the above described step of determining which color domain encompasses the color coordinate position of each analyzed color entails the prior step of selecting in the given colorimetric system a plurality of particular color coordinate points such that lines established by other points equally spaced from the particular selected color coordinate points define the boundaries of the color domains. A comparison is then made to determine which of the particular selected color coordinate points is nearest the coordinate position of each analyzed color from the photograph. Because of the above noted coordinate point selection method, the nearest particular point lies in and thereby establishes the color domain encompassing the color coordinate position of each analyzed color. This method of coordinate point comparison permits the location of an appropriate domain for each analyzed color with conventional computer memory techniques.

Another feature of the invention is the use of a three-dimensional tristimulus colorimetric system in the methods described above. Utilization of the tristimulus colorimetric system facilitates a determination of the color coordinate positions of colors in the photograph in that conventional primary color analyzer systems can be employed to analyze the photographs. According to another preferred embodiment of the invention, however, the original selection of color domains is first made in a three-dimensional polar coordinate colorimetric system utilizing hue, saturation and lightness as color components. Such a colorimetric system is more perceptible psychologically and therefore simplifies the selection of appropriate color domains. Once selected the coordinates defining boundaries of the selected color domains are mathematically transformed into equivalent coordinates of the tristimulus colorimetric system desired for analysis of the photograph.

According to another featured embodiment of the methods described above, the step of selecting a plurality of color domains and then providing a palette consisting of a distinctly colored paint for each domain entails the selection of a plurality of sets of color domains and a corresponding palette for each. The tonal variations in each selected color domain and corresponding palette set are unique. For example, one set might approximate the tonalities present in a photographic subject of light skin and blond hair while another set might correspond to the tonalities present in a photograph of a subject with dark skin and black hair. The particular set of color domains and corresponding palette used in the above described methods is then selected from this plurality of sets after a comparison thereof with the particular photograph to be rendered. In this way individual palettes each composed of a relatively small number of distinctly colored paints can be employed to produce harmonious and relatively tonally correct renderings of photographs with widely different tonal representation.

DESCRIPTION OF THE DRAWINGS

These and other objects and features of the present invention will become apparent upon a perusal of the following description taken in conjunction with the accompanying drawings wherein:

FIGS. 4–10 are graphs plotting hue and saturation color components, each graph representing a different common level of color value.

DESCRIPTION OF THE PREFERRED EMBODIMENTS

Figure 1:
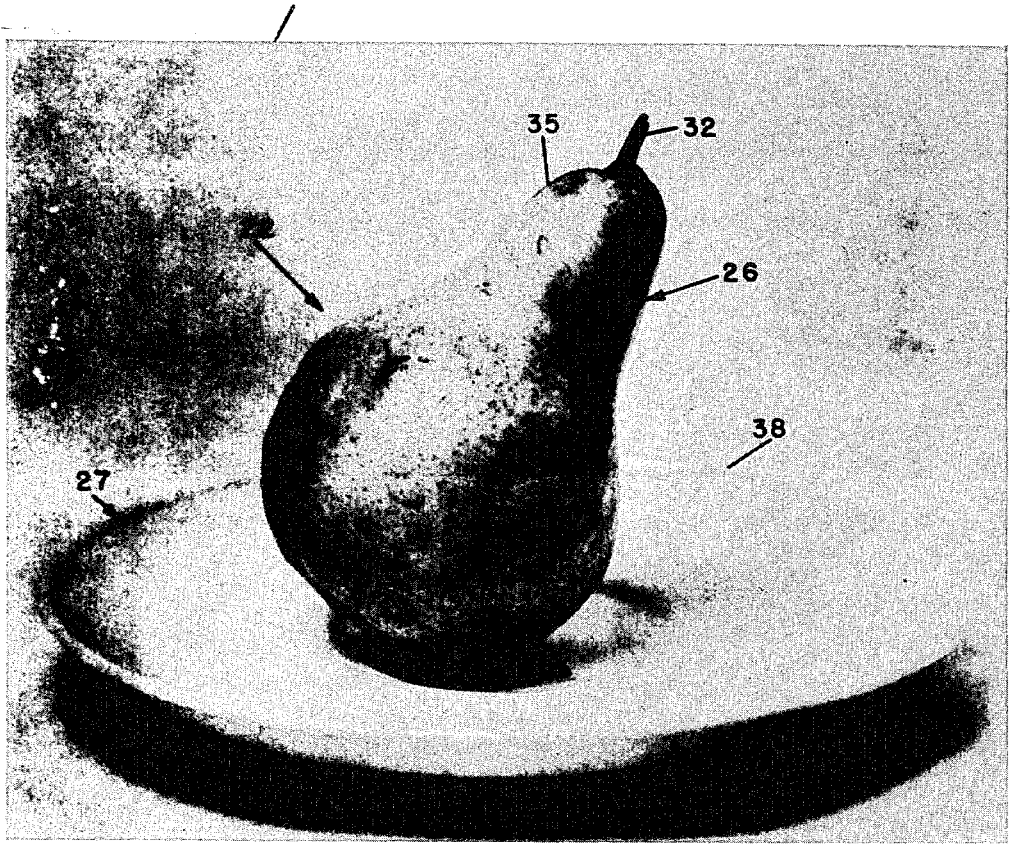
FIG. 1 is a reproduction of a photograph used to describe the present invention.
Figure 2:
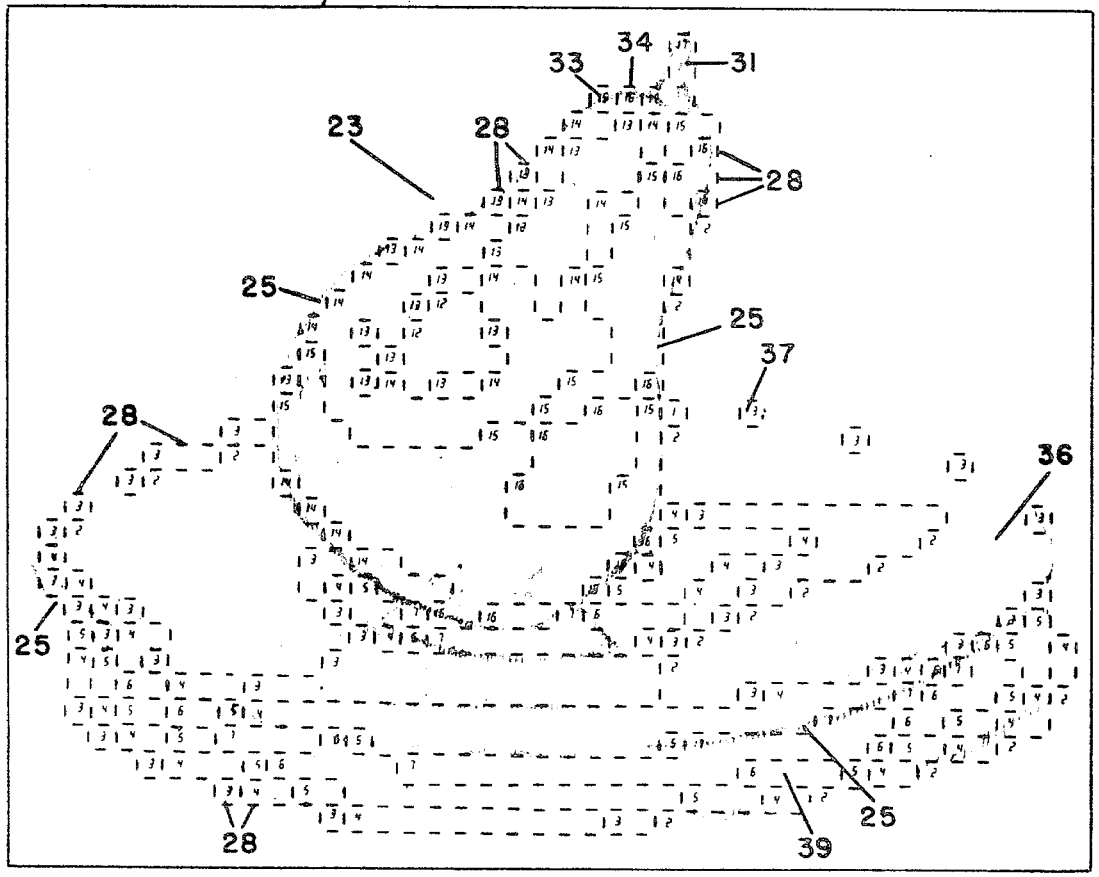
FIG. 2 is a schematic illustration of a diagrammed surface for use in creating a rendering of the photograph shown in FIG. 1.

In the interest of providing a readily intelligible presentation, the invention will be described in connection with a specific embodiment thereof. That embodiment entails a method by which a uniquely diagrammed paint receiving surface can be produced from any multi-colored photograph. An artist utilizing the imprinted diagram for guidance while applying paints to the surface can create a rendering of the original photograph. According to this embodiment of the invention, a colored photograph 21 such as a still life 22 shown reproduced in FIG. 1 is used to produce a diagrammed surface of the type shown in FIG. 2. In a preferred embodiment, the diagram 23 of FIG. 2 is applied, for example, to a board or a canvas 24 suitable for receiving oil or water color paints. The diagram 23 includes solid indicia lines 25 that correspond to image outlines of a pear 26 and a plate 27 that form the still life 22. Also included in the diagram 23 are dashed indicia lines 28 that are distinguishable from the solid lines 25 and which define distinct area portions of the pear and plate outlined thereby. As shown for example, the dashed lines 28 define an area 31 having a backward L-shape that geometrically corresponds in position to the pear stem 32 shown in FIG. 1. Directly adjacent the area 31 in FIG. 2 are a pair of small square shaped areas 33 and 34 corresponding in position to a top edge 35 of the pear 26 shown in FIG. 1. Similarly, the dashed lines 28 define a large non-uniformly shaped area 36 corresponding in position to a discrete portion of the plate 27 shown in FIG. 1, small square area 37 representing a portion of an edge 38 of the plate 27, and a rectangularly shaped area 39 geometrically corresponding in position to a portion of a shadow created by the plate 27 in the photograph 21. Without specifically describing further details of the diagram 23 (FIG. 2), it will be apparent that the dashed lines 28 define a large number of areas that lie within the solid lines 25 and correspond in position to discrete portions of the still life 22 shown in FIG. 1.

As further illustrated in FIG. 2, within each of the areas defined by the dashed lines 28 there is a numerical designation. For example, above described area 31 bears the numerical designation 17; areas 33 and 34, respectively, bear designation numerals 15 and 16, area 36 bears designation numeral 2, area 37 bears designation numeral 3; and area 39 bears designation numeral 6. Each of the designation numerals applied to the discrete areas formed by dashed lines 28 identifies a distinctly colored oil paint to be applied thereto. Accordingly, a complete product for the FIG. 2 example would comprise the diagrammed paint board 24 and a palette consisting of 13 distinctly colored paints each identified by one of the designation numerals 1-7 and 12-17. In using the product, an artist would create in oil paints a rendering of the still life 22 (FIG. 1) on the paint board 24 (FIG. 2) utilizing the solid lines 25 to establish object boundaries and the designated areas formed by dashed lines 28 to locate paint color placement.

The present invention is not directed, per se, to the specific methods by which the object outlines 25 or the dashed lines 28 are produced on the paint surface 24. These operations can be performed by any of a number of known techniques. For example, the outline 25 can be imprinted on the paint board surface 24 by either a facsimile painter or mechanical plotter controlled by an output of a conventional scanner that detects film density gradients in the photograph 21. The film density gradients correspond to the object detail boundaries that are to be represented by the outlines 25. Examples of suitable gradient detectors are disclosed in U.S. Pats. Nos. 2,851,522 and 3,361,872 and in the applicant's copending U.S. application Ser. No. 71,816, filed Sept. 14, 1970, and entitled, "Detail Boundary Detection Systems." Similarly, the areas defined by the dashed lines 28 (FIG. 2) which areas correspond to uniformly colored portions of the photograph 21 (FIG. 1) can be identified by any of a number of conventional color analyzer techniques.

Figure 3:
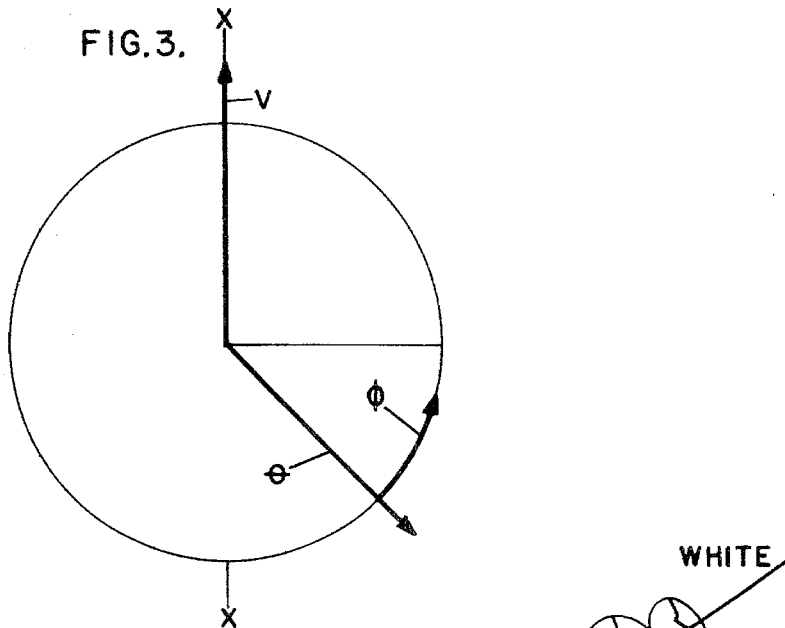
FIG. 3 is a schematic representation of a polar coordinate colorimetric system utilizing value, hue and saturation as components.

Examples of colorimeter systems suitable for analyzing the areas are described in "Color Science," by Günter Wyszecki and W. S. Stiles; published in 1967 by John Wiley and Sons, Inc.; pages 228-370. As described below, the present invention is concerned with a method for determining the specific color that is to be applied to each of the areas defined by the dashed lines 25. An initial step of the invention is the selection in a given colorimetric system of discrete color domains to represent various tonalities present in the photograph to be rendered. In a preferred method, the color domains are initially established in a three-dimensional polar coordinate colorimetric system of the type illustrated in FIG. 3. In that system, the value component V of a given color (also known as lightness or brightness of the color) is measured along an axis $x$—$x$, a component of saturation $\theta$ (also known as chroma) is measured radially from and perpendicular to the axis $x$—$x$, and components of hue are measured by an angle $\phi$. A preferred approach to the establishment of appropriate color domains is diagrammatically illustrated in FIG. 4 which is a graph plotting color component values of hue and saturation in the colorimetric system shown in FIG. 3 with the relative positions of the primary colors red, blue and green indicated.

The color photograph of which a rendering is to be made is systematically scanned with a conventional color analyzer system that measures, for example, tristimulus component values of the various colors present in the photograph. Such a color analyzer can provide, for example, the red, blue and green component values of each color vector present in the photograph. The color components thus obtained are then transferred by conventional mathematical operations into components compatible with the colorimetric system shown in FIG. 3. Descriptions of such transformations can be found, for example, in "Color Science" (Günter Wyszecki and W. S. Stiles), published by John Wiley & Sons, Inc. The desired component values for hue and saturation are then plotted as indicated by the points $p$ in FIG. 4. The locations of particular sets of points $p$ that represent colors present in specific portions of the photograph and zones or domains on the graph encompassing these points are identified. Next, strategically located coordinate positions represented in FIG. 4 by circular points P are selected such that lines $l$ defined by points equally spaced between adjacent points P define boundaries for the identified zones. The function of the color coordinate positions P will be described in detail below. Thus, for example, in a specific case involving the portrait of a photographic subject with light skin and blond hair, zone or color domain A might encompass all points $p$ representing analyzed colors of the subject's hair while zone or color domain B might encompass all points $p$ representing the analyzed flesh-tones present in the subject's face. Similarly, color domain C might encompass all points $p$ representing the analyzed pinkish colors present in the subject's lips while color domain D would encompass those points $p$ representing the neutral gray tones present in the photograph. Finally, color domains E, F, G and H would encompass points $p$ representing various background colors present in the photograph.

An oil paint rendering of the photograph represented by points $p$ clearly requires the use of a plurality of distinctly colored paints corresponding to the color domains A–H depicted in FIG. 4. However, in plotting the points $p$ on the two-dimensional graph shown in FIG. 4, the value components of the measured colors were ignored. To properly quantize the three-dimensional color space illustrated in FIG. 3, value component variations obviously must be considered. A number of practical considerations enter into the expansion of the two-dimensional zones A-H shown in FIG. 4 into three dimensional color domains involving value as well as hue and saturation. First, as described more fully below, each color domain established will be represented by a distinctly colored paint for use in creating a rendering of the original photograph. Consequently, the number of color domains established should be relatively small in number so as to simplify for the artist the identification of individual paints during the painting operation. A second consideration is to limit the number of color domains represented in distinct "highlight" areas of the photograph such as, for example, the subject's face area for the portrait case assumed here. Limiting the number of color domains represented by such areas, correspondingly limits the degree of intricacy involved during the application of paints to the corresponding areas of the painting. Still another consideration is that a larger variety of distinctly colored paints are desired at intermediate levels of value than at high and low levels thereof. This is because differences in hue and saturation are more perceptible at intermediate value levels than at either high value levels where all colors approach white or at low value levels where all colors approach black.

Influenced by the above noted considerations, seven color value steps establishing domains in three dimensional color space were selected for the instant example.

The graphs shown in FIGS. 4–10 are individual plots of hue and saturation at each of the selected value levels with the coordinate positions P plotted in FIG. 4 again shown in each of FIGS. 5–10. Also shown in FIGS. 5–10 with either dashed or solid lines for reasons described more fully below, are zones corresponding in size and position to the zones A–H shown in FIG. 4. By considering the numbers and locations of the points p (FIG. 2) with value components corresponding to each of the value levels represented in FIGS. 4–10, appropriate hue-saturation color domains were established at each value level. At an intermediate value level represented by FIG. 4 at which differences in hue and saturation are readily perceptible, an appropriate distinctly colored paint is selected to represent each of the color domains A–H. This is indicated in FIG. 4 by the use of solid lines to define each of the individually represented domains. Conversely, at a somewhat higher value level represented by FIG. 5 at which changes in hue and saturation are not so readily perceptible, the adjacent hair and fleshtone color domains A and B in FIG. 4 are combined into a single solid line bounded zone I. Similarly, the adjacent zones C and E of FIG. 4 are combined in FIG. 5 into a single zone J and zones F and G of FIG. 4 into a single zone K in FIG. 5. The domains corresponding to zones D and H of FIG. 4 are again present in FIG. 5 as zones L and M. Again, the solid line bounded zones I–M represent color domains of hue and saturation at the value level represented in FIG. 5 and an appropriately colored paint is selected for each of those domains. Thus, the number of individual paint represented color domains was reduced from eight at the value level of FIG. 4 to five at the value level of FIG. 5.

FIG. 6 is a plot of hue and saturation at the brightest value level selected. At this level differences in hue and saturation are even less perceptible so that a smaller selection of representative paint colors is required. Consequently, only two distinctly colored paints are provided to represent the value level of FIG. 6, one for each of the color domains N and O separated by a solid line. It will be apparent that the three color domains I, J and M and the two color domains L and K of FIG. 5 are combined respectively, into the single domains N and O in FIG. 6.

A plot of hue and saturation at the value level next lower to that represented in FIG. 4 is shown in FIG. 7. At this intermediate value level variations in hue and saturation are again readily perceptible. Consequently, seven distinctly colored paints are provided to represent that various hues and saturations, one for each of the domanins color domains P'–V bounded by solid lines in FIG. 7. Color domains P'–T and V correspond to similar color domains in FIG. 4 while the color domains A and H of that figure representing, respectively, blond hair and yellow tones are combined into the single domain U of FIG. 7. The next darker value level selected is represented by the plot of hue and saturation shown in FIG.8. Since the perceptibility of variations in hue and saturation is somewhat decreased at this value level, only five distinctly colored paints are provided. One paint color represents hues and saturations in each of the color domains W–Z and (a) bounded by solid lines in FIG. 8. Again, the color domains W and (a) of FIG. 8 correspond, respectively, to color domains P' and V of FIG. 7, while color domains R and Q and color domains S and T therein have been combined, respectively, into single color domains X and Y at the value level represented by FIG. 8.

Figure 10:
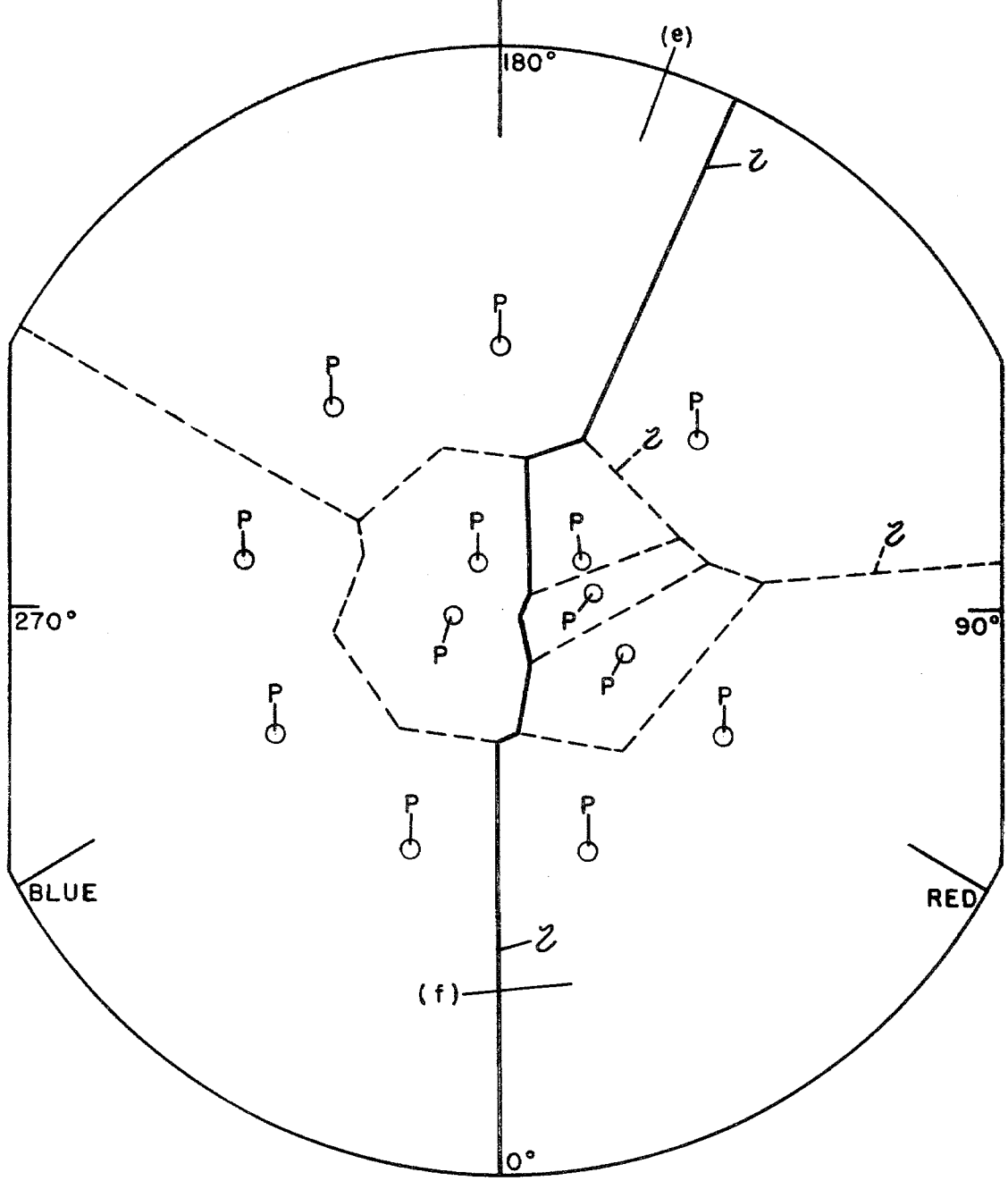

The selected value level next darker than that represented in FIG. 8 is shown in FIG. 9. Because of the further reduced perceptibility of hue and saturation variations at this darker value level only three distinctly colored paints are provided. An individual paint represents each of the color domains (b), (c) and (d) bounded by solid lines in FIG. 9. Color domain (b) of FIG. 9 corresponds to color domain Z of FIG. 8 while zones (a) and Y and zones W and X therein are combined, respectively, into zones (d) and (c) in FIG. 9. Finally, FIG. 10 represents the darkest selected value level at which variations in hue and saturation are hardly perceptible. Consequently, only two distinctly colored paints are provided, one for domain (e) corresponding to color domain (d) of FIG. 9 and one for color domain (f) corresponding to combined domains (b) and (c) of FIG. 9. Thus, thirty distinct color domains are established for all value levels represented by FIGS. 4–10 and a distinctly colored oil paint provided for each of those color domains.

Figure 11:
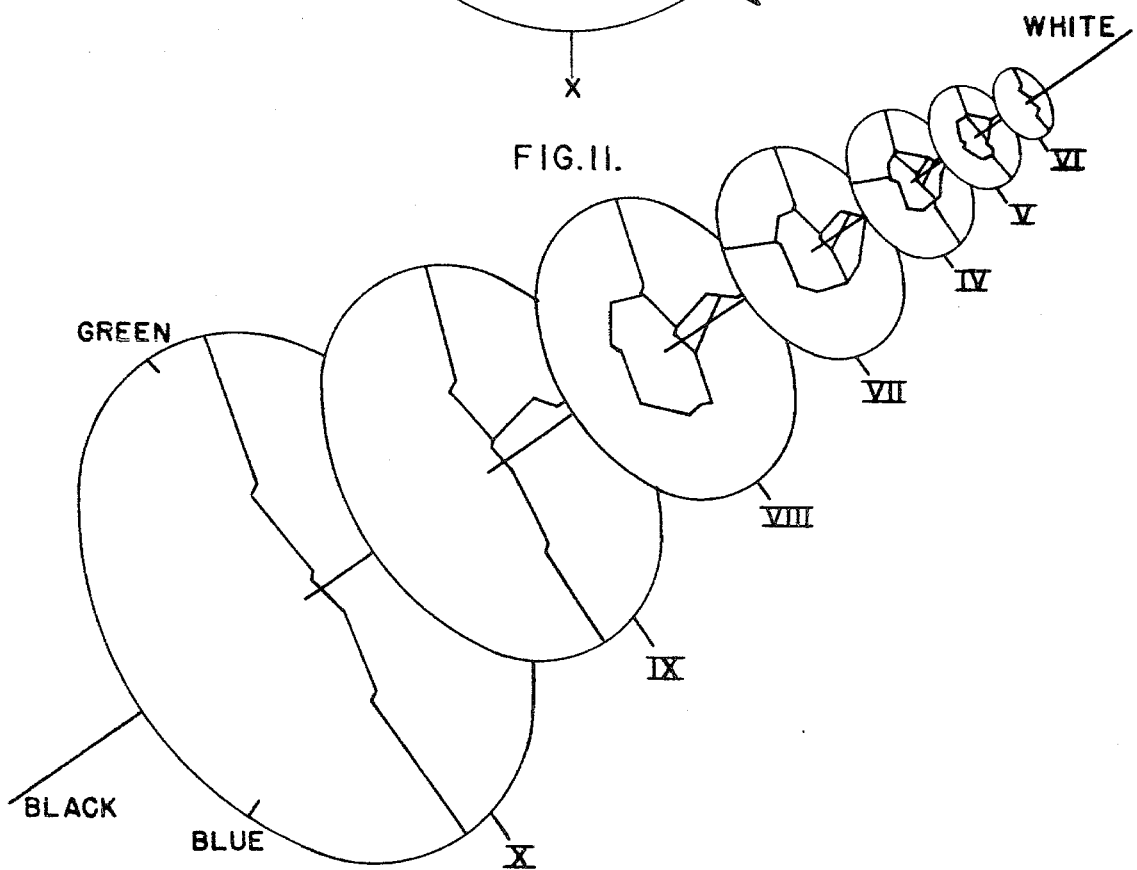
FIG. 11 is a perspective illustration of a colorimetric system including the constant valued color planes shown in FIGS. 4–10.

FIG. 11 illustrates in perspective a three dimensional color space including each of the constant valued hue and saturation plots of FIGS. 5–10. The planes of uniform value are shown perpendicular to the Black-White value axis and each plane is identified by a Roman numeral corresponding to the number of the figure it represents. As depicted in FIG. 11 the color space is conically shaped with an apex at a highest value level representing white and a base at a lowest value level representing black. FIG. 11 also diagrammatically illustrates another important feature of the present invention. As shown, the steps along the value axis between the selected value levels are not equal. Rather, the steps between selected value levels are larger at lower values than at higher values. For example, the spacing between low valued planes X and IX in FIG. 11 is substantially greater than the spacing between high valued planes V and VI. The effect of this is to provide a larger number of individual paint colors at the high value end of the color space than at the low value end. This is desirable because human perceptual response to variations in color falls off rapidly at the dark end of the value scale.

Having established a set of color domains as described above, those domains are used to produce a diagrammed work surface on which an oil paint rendering of a colored photograph can be made. The tonalities present in the photograph to be rendered should correspond generally to those used to established those domains. Thus, for example, a set of color domains and corresponding palette established as described above would be used to create renderings from colored photographs of light skinned, blond haired subjected. Other sets of color domains and corresponding paint palettes can be established similarly for use in rendering photographs retaining other tonal qualities. For example, a portrait of a subject with dark skin and dark hair would be used as described above to established a set of color domains and corresponding palette suitable for use with other photographic subjects of that type. In the same way, additional sets of color domains and corresponding palettes would be established for still other types of photographic subjects. It should be noted, however, that there is no requirement for a precise matching between a color domain-palette set and the particular photograph to be rendered. Having established a harmonious relationsihp between a set of color domains and corresponding palette, the set can be used to produce a painting of any photographic subject. The finished work will be a recognizable rendering of the subject with correctly reproduced gradations of color value although tonal variations between the photographic model and the painting may exist.

The manner in which a given set of color domains and corresponding paint palette are used to create a rendering of a particular photograph will be described with reference again to FIGS. 1 and 2. To establish the areas defined by the dashed lines in FIG. 2 and to also determine which paint colors are designated for those areas, a color analysis is made first of corresponding areas on the photograph 21 shown in FIG. 1. Such an analysis can be made with any conventional color analyzer system that provides measurements of color coordinate values for the colors present in the photograph. The positions of the measured color coordinates are then compared with the locations of the previously established color domains selected and, as described more fully below, individual paint colors are selected from the corresponding palette for use in rendering each other analyzed area of the photograph. Since conventional color analyzers provide tristimulus color coordinate values while the polar coordinate colorimetric system depicted in FIG. 11 is preferable for establishing color domains, a transformation between the different systems is required for the comparison process. As described below, automation of the color coordinate comparisons process is simplified if the color domains established in the system depicted in FIG. 11 are transformed into a tristimulus colorimetric system. However, the comparison process is more easily explained by reference to the system shown in FIG. 11. Therefore, let us here assume that measured tristimulus components of colors in the photograph 21 are converted into hue, value and saturation color coordinate components that correspond to the system shown in FIG. 11.

Having determined in that way the coordinate components of the vector value for a color in a given portion of the photograph 21, a comparison is made to determine which of the previously established position points P is nearest in color space to that vector value. The color domain encompassing that nearest point then determines the particular paint color that will be used to render the corresponding area on the paint board 24. For example, assume that an analysis of the relatively dark color present in the stem portion 32 of the pear 26 (FIG. 1) provides components of hue, value, and saturation that are represented most closely by the color coordinate position represented by point P–1 in FIG. 9. In that case the oil paint selected to represent the color domain (b) encompassing the point P–1 is used to render the area 31 (FIG. 2) corresponding in position to the analyzed stem portion 32 of the photograph. Assuming further that the particular color selected for the color domain (b) has been designated with the numeral 17, that designation is applied to the area 31 as shown in FIG. 2. Next, assume that a color analysis of edge portion 35 of the pear 26 (FIG. 1) corresponding to areas 33 and 34 on the diagrammed board 24 (FIG. 2) provides color vector values that are most closely approximated, respectively, by coordinate position points P–2 in FIG. 8 and P–3 in FIG. 7. Again, the oil paints representing the color domains Z and U, respectively, encompassing the nearest points P–2 and P–3 will be applied to areas 33 and 34 of the paint board 24. Accordingly, the designations selected for those paints, in this case the numerals 15 and 16, respectively, are imprinted on the areas 33 and 34 as shown in FIG. 2. In the same manner an appropriate colored paint from the palette representing the various color domains shown in FIGS. 4–10 is selected for each of the surface areas defined by the dashed lines 28 (FIG. 2) and the designating numeral for each paint imprinted on that area.

To simplify an understanding of the color coordinate comparison process used in the selection of appropriate palette colors for various areas to be rendered, the above explanation employed the polar coordinate colorimetric system schematically shown in FIG. 11. However, as noted above, tristimulus component values are preferred for the comparison. Accordingly, the polar coordinate component values of the selected points P in FIGS. 4–10 normally would be transformed into corresponding tristimulus component values thereby defining equivalent color domains in a tristimulus colorimetric system. The transferred coordinate positions can then be compared directly with tristimulus component values obtained during analysis of the photograph with conventional color measurement systems. The comparison can be made, for example, with conventional computer technology wherein the preestablished component values of the color domain defining points P are stored in memory banks. The stored values can then be automatically and continuously compared with measured tristimulus color component values obtained during a scan of the photograph by a color analyzer system. Simultaneously, the paint color representing the color domain found to encompass each analyzed color can be determined and the appropriate designation for that paint color applied to a paint board by a conventional computer controlled print-out mechanism.

It will be obvious that the specific oil painting method described above is merely exemplary and that the color selection techniques disclosed herein can be used to produce other types of creative renderings including, for example, needlework, ceramic mosaics, custom-dyed rugs, etc. In still other applications, a diagrammed work surface can be used as a guide to create renderings on an auxiliary surface. For example, by positioning the board 24 (FIG. 2) against one surface of a transparent substrate, such as a glass window, the indicia 25 and 28 visible through the substrate can be used as described above to produce a rendering on its opposite surface. In a similar approach, the indicia 25 and 28 can be produced on a transparent board 24 and then projected onto a wall or other auxiliary surface. The projected indicia are then used in the manner described above to produce on the auxiliary surface a mural of the original image. In still another application of this type a transfer substance such as carbon can be applied to the back surface of a diagrammed sheet of the type shown in FIG. 2. A rendering is then created by placing the diagrammed sheet on an auxiliary surface and exerting therebetween pressure that induces transfer of the backing substance onto the auxiliary surface. Contrast in the rendering can be produced either by selectively varying the lateral distribution of the transferred substance or by varying the transfer pressure to control its density. In either case, employing both the color designations and area indicia on the diagrammed surface as guides results in a recognizable rendering of the original image. In a somewhat related process an originally prepared guide diagram of the type shown in FIG. 2 can be used to create a plurality of individual printing blocks each including raised portions corresponding to certain commonly designated areas on the guide. The printing blocks would then be selectively inked and sequentially applied to an auxiliary surface in a conventional manner to crease a printed rendering of the original image. It is to be understood also that the use in the instant disclosure of the term multi-colored encompasses variations in any of the color components value, hue, or saturation. Thus, the method described and claimed can be used to create multi-colored renderings that include variations in any of these components taken either individually or in any combination. For example, a black and white multi-colored rendering can be created by employing multi-valued colors of constant hue and saturation.

Obviously, many other modifications and variations of the present invention are possible in light of the above teachings. It is to be understood, therefore, that the invention can be practiced otherwise than as specifically described.

What is claimed is:

1. A method for producing a rendering of at least a portion of a particular multi-colored image comprising the steps of:

(a) selecting a given set of color domains;

(b) identifying the boundaries of each of said color domains in a given colorimetric system by selecting a plurality of particular color coordinate points in said given colorimetric system such that given lines established by other points equally spaced from said particular color coordinate points define the boundaries of each of said color domains and wherein at least some of said color domains encompass a plurality of said particular color coordinate points;

(c) selecting a distinct designation to represent each of said domains;

(d) analyzing the color present in each of a plurality of portions of said image to determine the color coordinate positions of said analyzed colors in said given colorimetric system;

(e) locating areas on a surface that geometrically correspond in position to said portions of said image;

(f) determining which of said color domains encompasses the color coordinate position of each of said analyzed colors by comparing the color coordinate positions of each of said portion colors with all said particular color coordinate points to determine which of said particular color coordinate points is nearest that of each of said portion colors; and (g) associating with each of said areas the distinct designation for that color domain that encompasses the color coordinate position of the analyzed color in the geometrically corresponding portion of said image.

2. A method according to claim 1 wherein said step of locating said areas comprises the step of producing indicia that define on said surface of the boundaries of each of said areas.

3. A method according to claim 2 wherein said step of producing said indicia comprises applying said indicia to said surface.

4. A method according to claim 2 including the step of displaying on each of said areas said distinct designation associated therewith.

5. A method according to claim 4 wherein said steps of producing said indicia and displaying said designations comprise the steps of applying said indicia and said designations to said surface.

6. A method according to claim 4 including the steps of providing a plurality of colored substances each having a distinct color, and associating with each of said substances one of said distinct designations.

7. A method according to claim 6 including the step of applying on each of said areas the particular said substance associated with the designation displayed thereon.

8. A method according to claim 4 including the step of producing on said surface an outline of distinguishable objects present in said image.

9. A method according to claim 4 including the step of utilizing said surface as a guide in creating a rendering of said image on an auxiliary surface.

10. A method according to claim 9 wherein said utilizing step comprises utilizing said surface to locate on said auxiliary surface auxiliary areas corresponding to said areas on said surface.

11. A method according to claim 10 including the steps of providing a plurality of colored substances each having a distinct color, and associating with each of said substances one of said distinct designations.

12. A method according to claim 11 including the step of applying on each of said auxiliary areas the particular said substance associated with the designation displayed on the corresponding area of said surface.

13. A method according to claim 4 wherein said color domains comprise volumes in a three-dimensional colorimetric system.

14. A method according to claim 4 wherein said given colorimetric system is a tristimulus colorimetric system.

15. A method according to claim 14 wherein step (a) comprises the step of first selecting said plurality of color domains in an auxiliary three dimensional colorimetric system utilizing hue, saturation and lightness as components.

16. A method according to claim 4 wherein step (a) comprises the steps of:

(h) color analyzing a plurality of types of multicolor images;

(i) examining the distribution of colors present in each of said types;

(j) selecting a plurality of sets of color domains one for each of said types;

(k) providing different sets of colored substances to represent the domains in each of said color domain sets;

(l) comparing the colors present in said particular multi-colored image with the substance colors in each of said substance sets; and (m) selecting said given set of color domains from said plurality of sets of color domains.

17. A method according to claim 1 including the steps of associating a different color with each of said distinct designations, and applying to each of said areas the color associated with the designation for that color domain that encompasses the color coordinate position of the analyzed color in the geometrically corresponding portion of said image.

18. A method for producing a rendering of at least a portion of a particular multi-colored image comprising the steps of:

identifying in the image the boundaries of image portions of substantially uniform color;

selecting a distinct designation to represent each of said substantially uniform colors;

locating areas on a surface that geometrically correspond in position to the positions of said portions of said image;

producing on said surface area indicia that defines the boundaries of said areas;

associating with each of said areas the distinct designation for that substantially uniform color in the geometrically corresponding portion of said image;

identifying distinguishable objects present in the image; and producing on said surface, object indicia distinguishable from said area indicia and outlining on said surface, objects corresponding in shape and position to those of said distinguishable objects identified in the image.

19. A method according to claim 18 wherein said step of associating with each of said areas the distinct designation for that substantially uniform color comprises applying said distinct designation to the geometrically corresponding area of said surface.

20. A method according to claim 18 including the steps of selecting a different colored paint for each of said distinct designations, and applying to each of said areas the paint selected for the distinct designation thereon while maintaining relatively sharp demarcations between said different colored substances along lines defined by said object indicia.

21. A method according to claim 18 wherein most of said areas on said surface are abstractly shaped.

22. A method according to claim 21 wherein most of said objects outlined on said surface by said object indicia encompass a plurality of said abstractly shaped areas.

23. A method according to claim 18 wherein all of said areas are defined by rectilinear lines.

24. A method according to claim 23 wherein said object indicia comprises curvilinear lines.

25. A method for producing a rendering of at least a portion of a particular multi-colored image comprising the steps of:

color analyzing a plurality of types of multi-colored images;

examining the distribution of colors present in each of said types;

selecting a plurality of sets of color domains, one for each of said types;

identifying the boundaries of each of said color domains in a given colorimetric system;

selecting a distinct designation to represent each of said domains;

selecting for said particular multi-colored image a given set of color domains from said plurality of sets of color domains;

analyzing color present in each of a plurality of portions of said image to determine the color coordinate positions of said analyzed colors in said given colorimetric system;

locating areas on a surface that geometrically correspond in position to said portions of said image;

determining which of said color domains in said given set encompasses the color coordinate position of each of said analyzed colors; and associating with each of said areas the distinct designation for that color domain in said given set that encompasses the color coordinate position of the analyzed color in the geometrically corresponding portion of said image.

26. A method according to claim 25 including the steps of associating a different color with each of said distinct designations, and applying to each of said areas the color associated with the designation for that color domain in said given set that encompasses the color coordinate position of the analyzed color in the geometrically corresponding portion of said image.

References Cited

UNITED STATES PATENTS

| 3,181,987 | 5/1965 | Polevitzky | 178—5.2 R |
| 2,876,574 | 3/1959 | Powell | 117—37 R |
| 2,825,150 | 3/1958 | Steiner | 117—37 R |

ALFRED L. LEAVITT, Primary Examiner

M. F. ESPOSITO, Assistant Examiner

U.S. Cl. X.R.

96—23; 178—5, 5.2